US009088383B2

(12) United States Patent
Tanaka et al.

(10) Patent No.: US 9,088,383 B2
(45) Date of Patent: Jul. 21, 2015

(54) TRANSMITTING APPARATUS, RECEIVING APPARATUS, OPTICAL FREQUENCY DIVISION MULTIPLEX TRANSMISSION SYSTEM, AND OPTICAL SIGNAL COMMUNICATION METHOD

(71) Applicant: FUJITSU LIMITED, Kawasaki-shi, Kanagawa (JP)

(72) Inventors: Toshiki Tanaka, Setagaya (JP); Masato Nishihara, Kawasaki (JP); Tomoo Takahara, Kawasaki (JP); Tomoyuki Kato, Yokohama (JP); Yutaka Kai, Kawasaki (JP); Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 14/017,607

(22) Filed: Sep. 4, 2013

(65) Prior Publication Data
US 2014/0099115 A1   Apr. 10, 2014

(30) Foreign Application Priority Data
Oct. 9, 2012  (JP) ................ 2012-224466

(51) Int. Cl.
*H04J 14/00* (2006.01)
*H04J 14/02* (2006.01)
*H04L 27/26* (2006.01)

(52) U.S. Cl.
CPC ........... *H04J 14/0298* (2013.01); *H04J 14/028* (2013.01); *H04L 27/2697* (2013.01)

(58) Field of Classification Search
USPC .......................................................... 398/79
See application file for complete search history.

(56) References Cited

U.S. PATENT DOCUMENTS

| 2007/0147838 | A1* | 6/2007 | Kim et al. ................. 398/72 |
| 2010/0239259 | A1* | 9/2010 | Forghieri et al. .......... 398/79 |
| 2011/0229138 | A1 | 9/2011 | Watanabe |
| 2012/0020665 | A1 | 1/2012 | Watanabe |

FOREIGN PATENT DOCUMENTS

| JP | 2011-215603 | 10/2011 |
| WO | 2010-125657 | 11/2010 |

OTHER PUBLICATIONS

S. Watanabe, et al., "All-Optical Data Frequency Multiplexing on Single-Wavelength Carrier Light by Sequentially Provided Cross-Phase Modulation in Fiber", IEEE Journal of Selected Topics in Quantum Electronics, vol. 18, No. 2, pp. 577-584, Mar./Apr. 2012.

* cited by examiner

*Primary Examiner* — Danny Leung
(74) *Attorney, Agent, or Firm* — Fujitsu Patent Center

(57) ABSTRACT

A transmitting apparatus is used in an electrical frequency division multiplex transmission system including nodes that are on an optical transmission path and that respectively frequency-multiplex a sub-carrier of a unique frequency and a carrier wave to transmit information to a receiving apparatus on the optical transmission path. The transmitting apparatus is disposed in each node and includes a determining unit that receives an input of information concerning unused sub-carriers of a transmission signal in the optical transmission path and determines transmission of the information to the receiving apparatus using an unused sub-carrier; an electrical frequency division multiplex transmission unit that using a frequency of the unused sub-carrier determined by the determining unit, modulates the input information to be transmitted to the receiving apparatus; and a coupling unit that adds to the transmission signal in the optical transmission path, a modulated modulation signal.

12 Claims, 6 Drawing Sheets

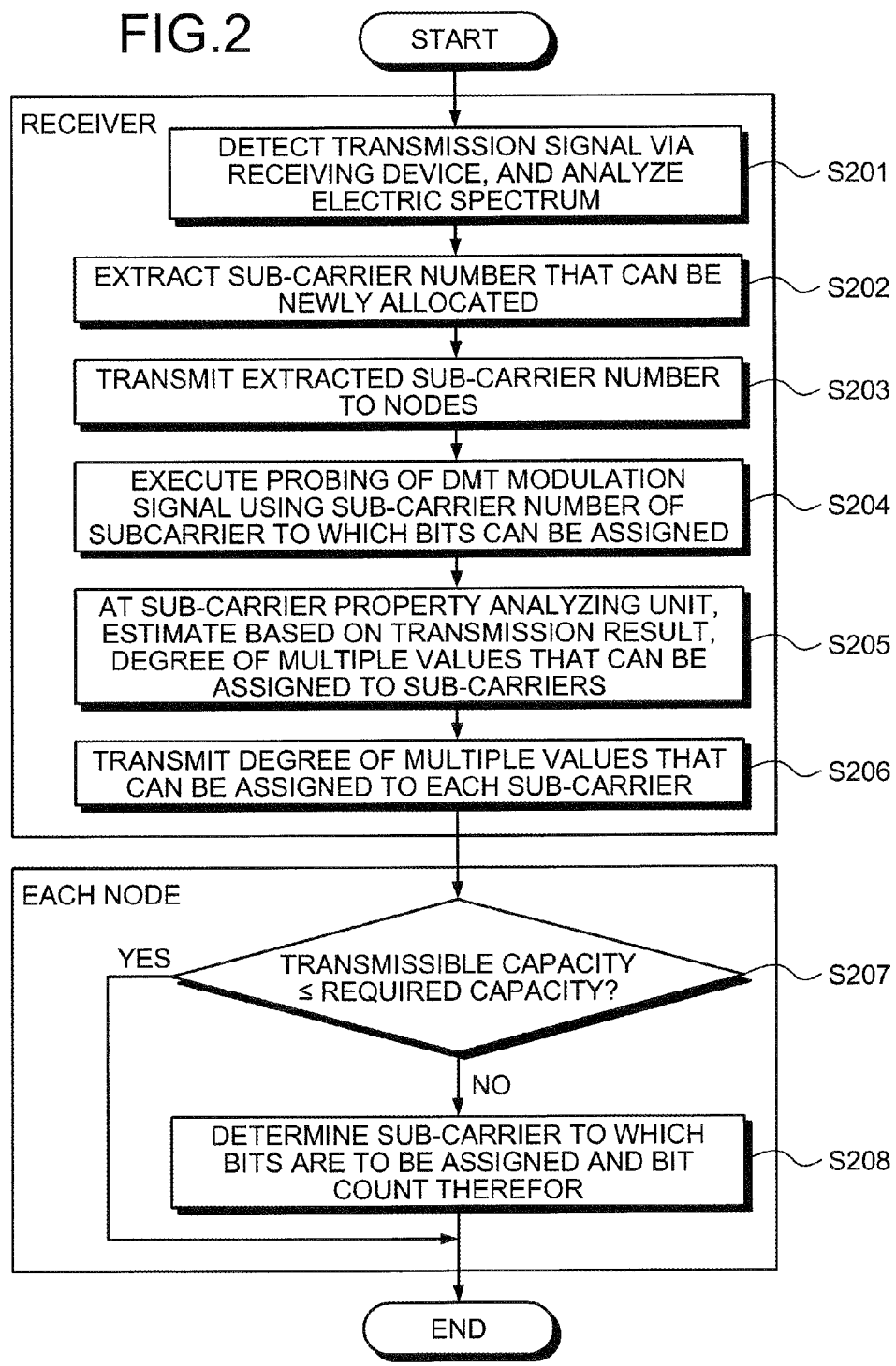

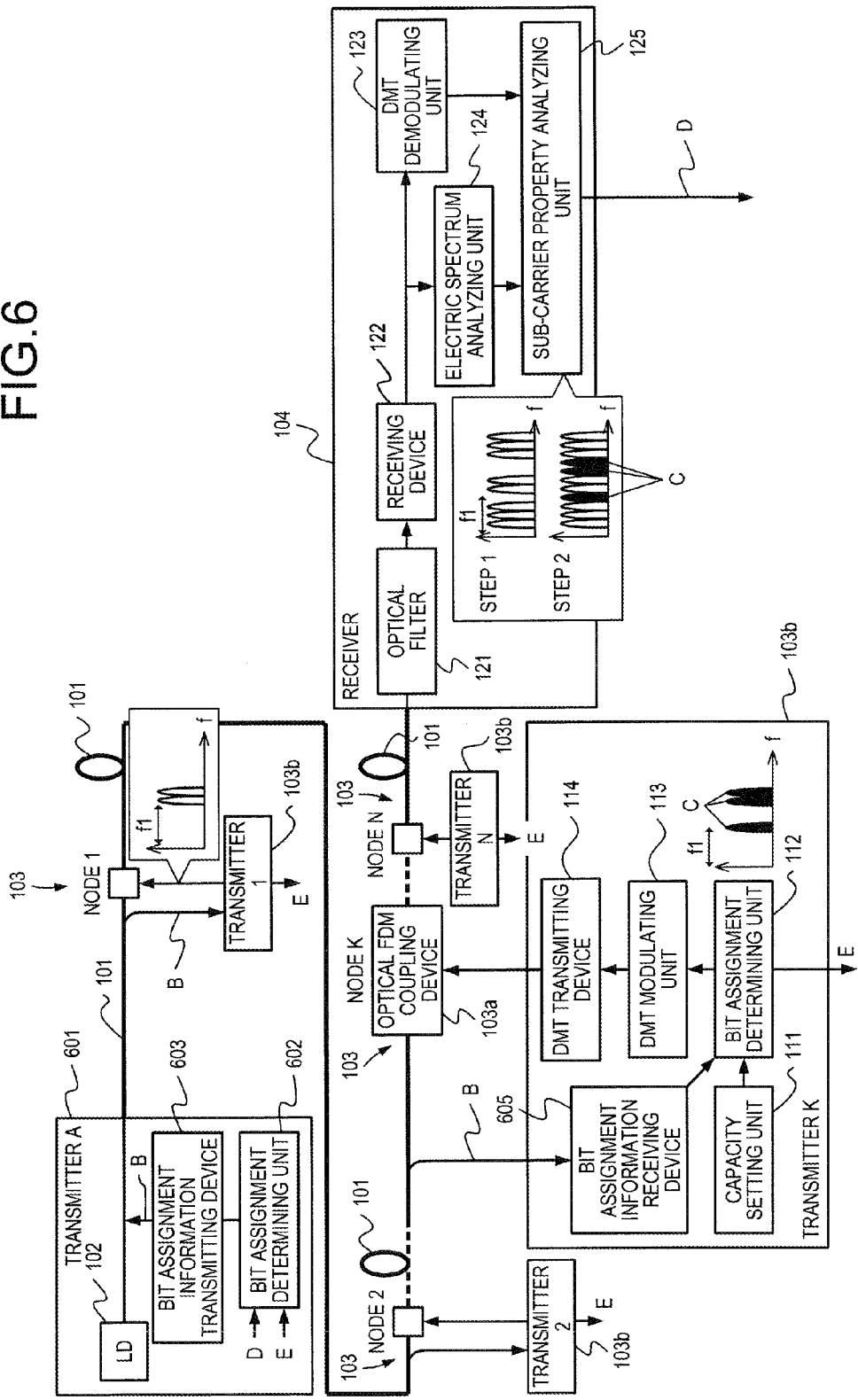

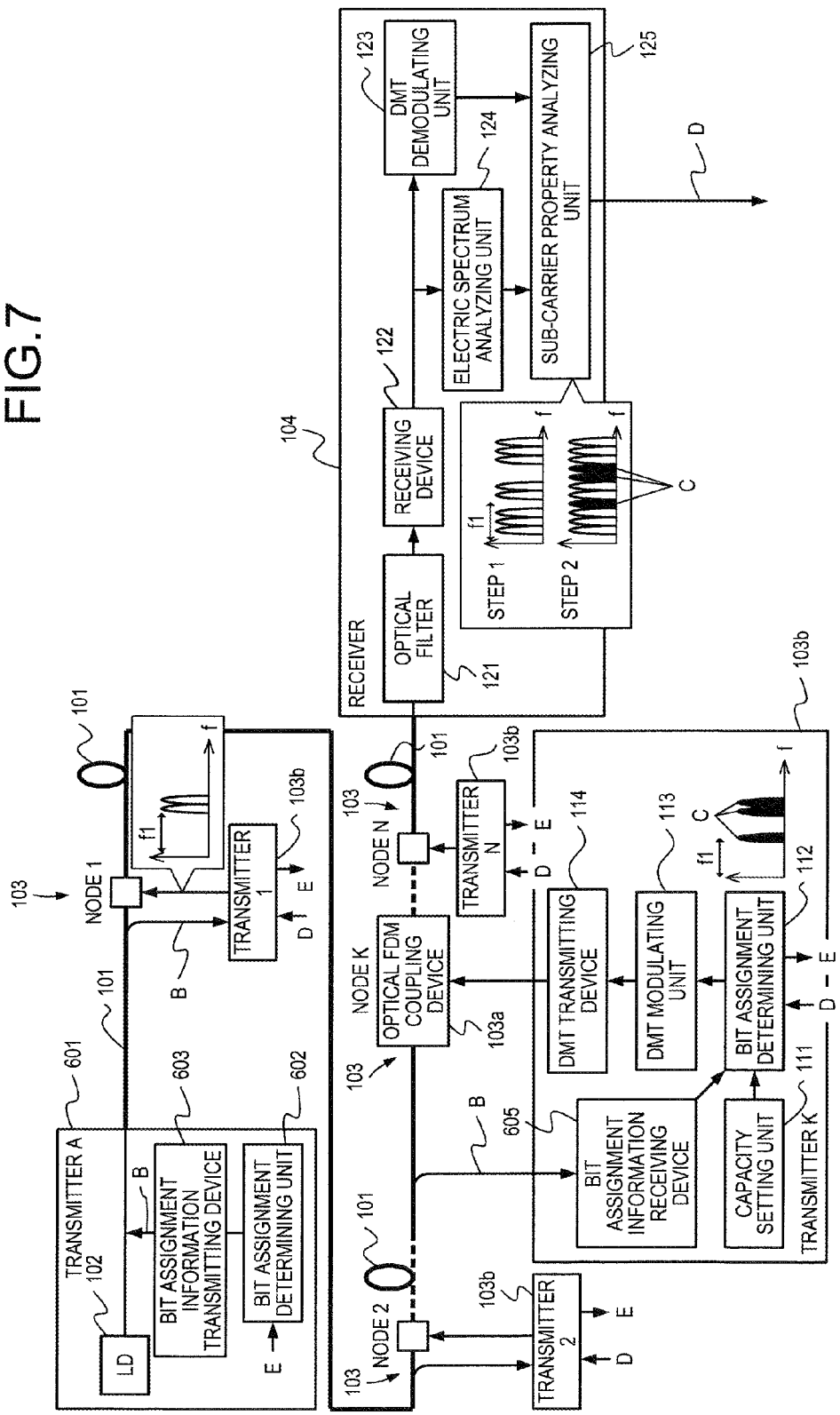

TRANSMITTING APPARATUS, RECEIVING APPARATUS, OPTICAL FREQUENCY DIVISION MULTIPLEX TRANSMISSION SYSTEM, AND OPTICAL SIGNAL COMMUNICATION METHOD

CROSS REFERENCE TO RELATED APPLICATIONS

This application is based upon and claims the benefit of priority of the prior Japanese Patent Application No. 2012-224466, filed on Oct. 9, 2012, the entire contents of which are incorporated herein by reference.

FIELD

The embodiments discussed herein are related to a transmitting apparatus, a receiving apparatus, an optical frequency division multiplex transmission system, and an optical signal communication method that employ a scheme of adding a sub-carrier modulation signal to carrier light and transmitting the signal and the carrier light.

BACKGROUND

Wavelength division multiplexing (WDM) is a technique of multiplexing optical signals of wavelengths (optical carrier frequencies) that differ from one another. According to WDM, baseband modulation is executed for each carrier wave among carrier waves of differing wavelengths and an optical coupling and decoupling device executes multiplexing and de-multiplexing of the carrier waves. To multiplex at narrow wavelength (frequency) intervals, highly precise wavelength control is required of the transmitters and wavelength de-multiplexer. Consequently, multiplexing at narrow wavelength (frequency) intervals is difficult.

Optical frequency division multiplexing (FDM) may be performed. In a system employing optical FDM, along an optical transmission path such as an optical fiber, plural nodes are disposed and carrier light is transmitted from a light source of a transmitting apparatus disposed at the starting point of the optical transmission path. Data signals at different sub-carrier frequencies are multiplexed and transmitted with the carrier wave from the plural nodes. The receiving side (a receiving apparatus) disposed at the end point of the optical transmission path receives information transmitted from the nodes (see, e.g., Japanese Laid-Open Patent Publication No. 2011-215603).

In the system employing optical FDM, the data signals are multiplexed with carrier light in a single optical transmission path and therefore, the receiving side merely has to receive the carrier light and therefore, can receive the information transmitted by the plural nodes by a simple configuration compared to that of the WDM.

However, the efficiency of frequency use cannot be improved for a system employing the conventional optical FDM. The sequence in which signals are transmitted by each node in the optical FDM system varies. Consequently, unused frequency bands occur for the frequencies (the sub-carriers) of the unused nodes in the entire frequency band used by the optical FDM.

In a case where the unused frequency bands are discrete, if frequency multiplexing is to be executed using a modulation signal corresponding to a single carrier, the configuration becomes complicated. Plural mixers and frequency oscillating devices are necessary to determine the frequency position (frequency difference) of the coupled signal against that of the carrier wave (at the frequency v0). Therefore, the configuration becomes complicated and the cost increases.

SUMMARY

According to an aspect of an embodiment, a transmitting apparatus is used in an electrical frequency division multiplex transmission including plural nodes that are on an optical transmission path and that respectively frequency-multiplex a sub-carrier of a unique frequency and a carrier wave to transmit information to a receiving apparatus on the optical transmission path. The transmitting apparatus is disposed in each of the nodes and includes a determining unit that receives an input of information concerning unused sub-carriers of a transmission signal in the optical transmission path and determines transmission of the information to the receiving apparatus using an unused sub-carrier; a electrical frequency division multiplex transmission unit that using a frequency of the unused sub-carrier determined by the determining unit, modulates the input information to be transmitted to the receiving apparatus; and a coupling unit that adds to the transmission signal in the optical transmission path, a modulation signal modulated by the electrical frequency division multiplex transmission unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a flowchart of a process of allocating a new sub-carrier in the optical frequency division multiplex transmission system;

FIG. 6 is a diagram of the optical frequency division multiplex transmission system according to a third embodiment; and FIG. 7 is a diagram of the optical frequency division multiplex transmission system according to a fourth embodiment.

DESCRIPTION OF EMBODIMENTS

Figure 1:
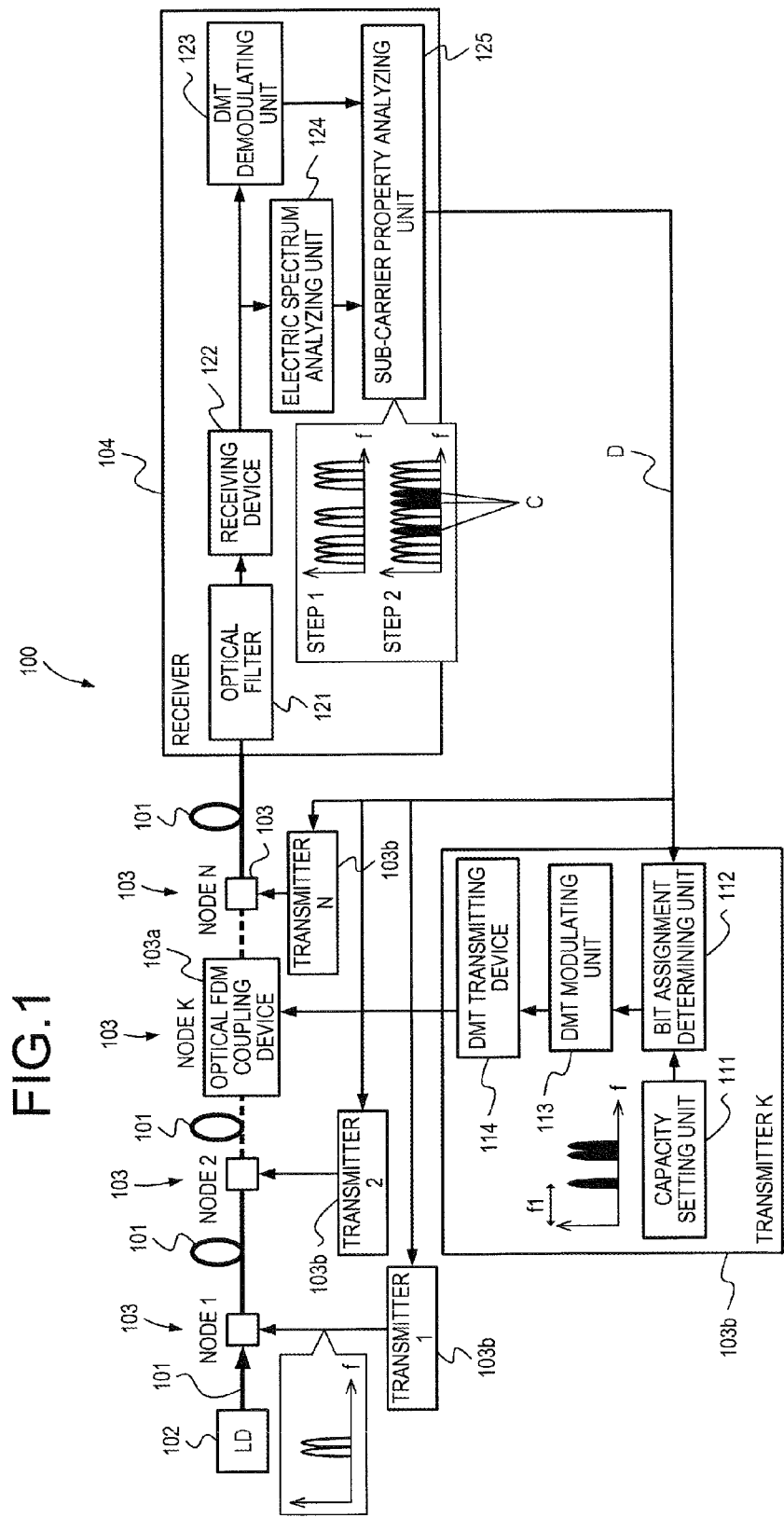
FIG. 1 is a diagram of an optical frequency division multiplex transmission system according to a first embodiment.

Preferred embodiments will be described in detail with reference to the accompanying drawings. FIG. 1 is a diagram of an optical frequency division multiplex transmission system according to a first embodiment.

The optical frequency division multiplex (FDM) transmission system 100 includes an optical transmission path 101 such as an optical fiber, and plural communicating apparatuses disposed on the optical transmission path 101. Roughly classifying by function, the communicating apparatuses include a light source 102, plural nodes (transmitting apparatuses) 103 on the optical transmission path 101, and a receiver (receiving apparatus) 104.

The light source 102 is disposed at a starting point (one end) of the optical transmission path 101, includes a laser diode (LD), etc., and inserts a carrier wave (at a frequency v0)

such as CW light, into the optical transmission path 101. The plural nodes (1 to N) 103 are disposed on the optical transmission path 101. The nodes 103 each include an optical FDM coupling device 103a and a transmitter 103b. Each of the nodes 103 has a data transmission function of individually sending information to the optical transmission path 101, thereby, appending (inserting or adding) the information to a transmission signal in the optical transmission path 101, and causing the information to be transmitted to the receiver 104. The receiver 104 is disposed at an ending point (the other end) of the optical transmission path 101. The receiver 104 collectively receives the information transmitted from the nodes 103 in the optical transmission path 101.

An internal configuration of a node K (103) depicted in FIG. 1 will be described. The other nodes 1 to N are each configured similarly to the node K. The transmitter 103b of the node 103 includes a capacity setting unit 111, a bit assignment determining unit 112, a discrete multi-tone (DMT) modulating unit 113 that executes discrete multi-tone modulation, and a DMT transmitting device 114. The capacity setting unit 111 sets an amount of data to be transmitted by the node K. A detecting unit (not depicted) detects variation of the data amount and the detected value is continually updated and set.

The bit assignment determining unit 112 receives from the receiver 104, an input of bit assignment information D for unused sub-carriers transmitted and an input of a required capacity set by the capacity setting unit 111. The bit assignment determining unit 112 determines the sub-carrier to which the bits for the information transmitted by the node 103 are to be assigned and the bit count of bits to be assigned, based on the required capacity and the bit assignment information D for the sub-carriers.

The DMT modulating unit 113 assigns to the sub-carrier determined by the bit assignment determining unit 112, the number of bits to be transmitted (bit count), and outputs a DMT modulation signal for data input from an external source. The DMT modulating unit 113 can modulate the information (data) accurately and simultaneously for plural sub-carrier central frequencies. The DMT transmitting device 114 outputs, as light, the DMT modulation signal modulated by the DMT modulating unit 113. The optical FDM coupling device 103a couples the carrier wave and the DMT modulation signal output from the transmitter 103b. The frequency difference f1 between the sub-carrier frequency and the frequency of the carrier wave corresponds to the frequency difference of the DMT signal and the baseband.

The receiver 104 includes an optical filter 121, a receiving device 122, a DMT demodulating unit 123, an electric spectrum analyzing unit 124, and a sub-carrier property analyzing unit 125.

As the optical filter 121, a filter is used that transmits only one side band (for example, an upper side band) of the optical signal received through the optical transmission path 101. The receiving device 122 includes a photo detector (PD) that converts an optical signal into an electrical signal. The DMT demodulating unit 123 DMT-demodulates the electrical signal output by the receiving device 122, demodulates the data component of the sub-carrier, and outputs the demodulated data component to an external destination.

The electric spectrum analyzing unit 124 analyzes and outputs the electric spectrum of the output from the receiving device 122. For example, the electric spectrum analyzing unit 124 analyzes and outputs the sub-carrier number, the sub-carrier count, and the degree of multiple values on the frequency axis. The sub-carrier property analyzing unit 125 analyzes the state of unused sub-carriers that can newly be allocated, based on the output of the electric spectrum analyzing unit 124 and the output of the DMT demodulating unit 123. As depicted in FIG. 1, in the analysis executed by the sub-carrier property analyzing unit 125, the sub-carrier property analyzing unit 125 executes step 1: an analysis of the sub-carrier number currently used, the sub-carrier count, and the degree of multiple values; and thereafter, executes step 2: an analysis of the sub-carrier number, the sub-carrier count, and the degree of multiple values for the sub-carrier that can be newly allocated for bit assignment. The sub-carrier property analyzing unit 125 outputs to each of the nodes 1 to N (103), bit assignment information D for the unused sub-carriers ("C" in FIG. 1) that can newly be allocated.

The DMT modulation scheme is a type of multi-carrier modulation scheme and can assign the bit count to the plural sub-carriers according to transmission property. When the S/N ratio is favorable, the degree of multiple values can be increased and the bit count (capacity) can be set for each of the sub-carriers. Thereby, the efficiency of frequency use can be improved with a simple configuration.

FIG. 2 is a flowchart of a process of allocating a new sub-carrier in the optical frequency division multiplex transmission system and depicts an example of the process executed by the receiver 104 and the nodes 103 depicted in FIG. 1.

The receiver 104 executes the operations at steps S201 to S206 and thereafter, each of the nodes executes the operations at steps S207 and 208. The receiver 104 detects the optical signal (a transmission signal) of the optical transmission path 101 via the receiving device 122, and analyzes the electric spectrum thereof via the electric spectrum analyzing unit 124 (step S201). The sub-carrier property analyzing unit 125 extracts the sub-carrier number that can be newly allocated for bit assignment (step S202). The receiver 104 inserts the extracted sub-carrier number into the bit assignment information D for the sub-carriers and transmits the bit assignment information D and the extracted sub-carrier number to the nodes 1 to N (103) (step S203).

The sub-carrier property analyzing unit 125 of the receiver 104 executes probing of the DMT modulation signal using the sub-carrier number of the subcarrier to which bits can be assigned (step S204). For example, the sub-carrier property analyzing unit 125 sets an initial value (the bit count of bits to be assigned: for example, two values) for the unused sub-carrier, inserts the bit setting value into the bit assignment information D, and transmits the bit assignment information D and the bit setting value to the nodes 1 to N (103).

In response to the probing, the nodes 1 to N (103) each execute transmission using the unused sub-carrier based on the initial value of the assigned bits and the DMT demodulating unit 123 receives the sub-carriers. The sub-carrier property analyzing unit 125 estimates based on the transmission result, the degree of multiple values that can be assigned to the sub-carriers (step S205), includes the degree of multiple values into the bit assignment information D for the sub-carriers, and transmits the bit assignment information D and the degree of multiple values that can be assigned to each of the sub-carriers (step S206). The transmission of the bit assignment information D for the sub-carriers from the receiver 104 to the nodes 1 to N (103) can be executed using an optical transmission path other than the optical transmission path 101 or by wired or radio communication.

In the node 103, the bit assignment information D for the sub-carriers is input into the bit assignment determining unit 112, from the receiver 104. The bit assignment determining unit 112 determines if the transmissible capacity is less than or equal to the required capacity (step S207). The transmissible capacity is acquired based on the number of unused sub-carriers indicated by the bit assignment information D for the sub-carriers and the degree of multiple values that can be set for each of the sub-carriers, and is determined by a comparison thereof with the required capacity corresponding to the data amount that the node 103 is to transmit.

As the result of the determination at step S207, if the bit assignment determining unit 112 determines that the transmissible capacity is less than or equal to the required capacity (step S207: YES), the node 103 causes the process to come to an end without executing bit assignment for a new sub-carrier. On the other hand, if the bit assignment determining unit 112 determines that the transmissible capacity exceeds the required capacity (step S207: NO), the bit assignment determining unit 112 determines that information transmission using the new sub-carrier is executable, and determines the sub-carrier to which the bits are to be assigned and the bit count therefor (step S208). Thereafter, the node 103 can send more information such as data, etc. to the optical transmission path 101 based on the DMT modulation including the sub-carrier newly allocated for bit assignment.

One or more unused sub-carrier(s) may be present. Therefore, each of the nodes 1 to N (103) can send information using the sub-carriers of a count that corresponds to the required capacity, and further sends additional information using an unused sub-carrier when the node has already started sending information. The nodes 1 to N (103) in the optical transmission path 101 similarly can send additional information. Therefore, each of the nodes 1 to N (103) sets the limit of the number of applicable sub-carriers in the bit assignment determining unit 112, etc., for the additional sending.

Thereby, a specific node among the nodes 1 to N (103) in the optical transmission path 101 can be prevented from occupying the unused sub-carriers.

The process procedure may by adapted to exclude the process of probing described to be executed at step S204. The process procedure may be adapted for the sub-carrier property analyzing unit 125 to set in advance, the transmission parameters of the sub-carrier in a table, etc. Thereby, such processes can be excluded as those of setting of the initial value of the bit assignment by the sub-carrier property analyzing unit 125, requesting for transmission of probing to the nodes 1 to N (103), and acquiring again the transmission property by the DMT demodulating unit 123.

According to the configuration above, when an unused sub-carrier occurs, the band can be increased for the nodes 103 in order of the order of transmission thereby including the new sub-carrier. Not limited hereto, the allocation of the sub-carriers may be executed for the nodes 103 in order of descending priority of the nodes 103.

In response to the continual variation of the required capacity of each of the nodes 103, the required capacity of the node 103 may be regularly sent to the receiver 104, and the sub-carrier property analyzing unit 125 of the receiver 104 may transmit the priority ranks to the nodes 103. In this case, the sub-carrier property analyzing unit 125 only has to transmit the priority ranks to the nodes 103 together with information on the priority to allocate the unused sub-carrier preferentially to the nodes 103 whose required capacities are each large. The priority may be set corresponding to not only the required capacity but also the service type such as the transmission speed, etc.

Figure 3A:
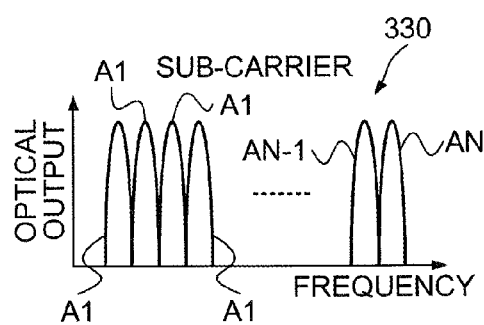
FIGS. 3A and 3B are graphs of an example of transmission properties according to sub-carrier.
Figure 3B:
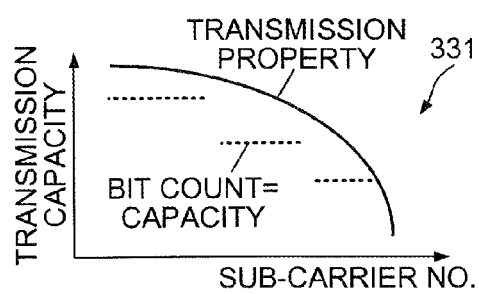

FIGS. 3A and 3B are graphs of an example of transmission properties according to sub-carrier. For example, when different sub-carriers 1 to N are allocated on the frequency axis as depicted in FIG. 3A, for example, the transmission capacity differs according to sub-carrier number as depicted in FIG. 3B. Accordingly, bit assignment is executed such that the transmission capacity differs for each sub-carrier number within the permissible range of the transmission property. Thereby, the degree of multiple values of the sub-carrier whose S/N ratio is favorable can be increased and the efficiency of frequency use can be improved. The sub-carriers can be set each at an arbitrary frequency.

As described, in the optical FDM scheme, unused sub-carriers are detected that are not used and the nodes can each send information using the sub-carriers based on the DMT modulation. Thereby, the efficiency of use of the frequencies used for the optical FDM can be improved and the transmission capacity can be increased. Especially, even when the unused sub-carriers discretely occur like fallen teeth, the vacancies can be filled for each sub-carrier and therefore, no signal congestion occurs and the efficiency of frequency use can be improved. The optical frequency multiplexing is enabled that fills the unused sub-carriers for the multi-carrier transmission without using any plural mixers and any frequency transmission sources. Therefore, the simple configuration can be employed and the cost can be reduced.

In a second embodiment, the receiver 104 at the end of the optical transmission path 101 is configured to include receivers (a carrier wave appended signal receiver and an optical FDM appended signal receiver) each employing a reception scheme different from each other.

Figure 4:
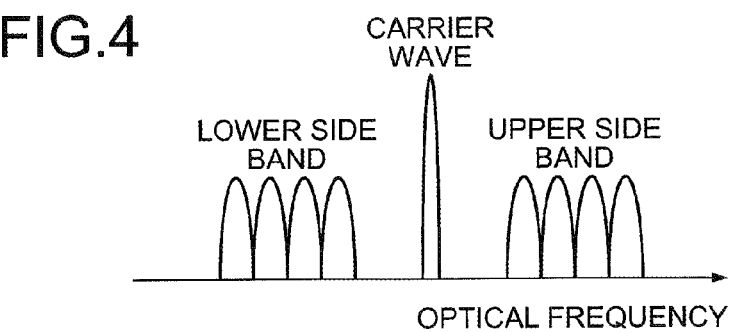
FIG. 4 is a graph of a modulation state of a carrier wave.

FIG. 4 is a graph of a modulation state of the carrier wave. When the carrier wave is modulated, upper and lower side bands occur on both sides of the carrier wave as depicted in FIG. 4. The second embodiment is configured to modulate the frequency in the vicinity of the frequency of the carrier wave and directly receive the carrier wave appended signal using the carrier wave appended signal receiver ("104b" of FIG. 5). In this case, the carrier wave appended signal receiver 104b can receive the two side bands that mutually enhance each other when the two side bands interfere with each other during the reception because the difference in the phase between the side bands is small.

On the other hand, when the DMT signal having a frequency difference greater than or equal to a predetermined frequency f1 with respect to the carrier wave (the optical FDM appended signal hereinafter) is directly received, the phases of the two side bands are substantially opposite to each other. Therefore, in a case where the two side bands are received when the side bands interfere with each other, the two side bands offset each other and cannot be received. Therefore, when the optical FDM appended signal receiver ("104a" of FIG. 5) receives the two side bands, the receiver 104a removes one of the side bands using an optical filter or adds relatively large wavelength dispersion to the side bands and thereby, causes a phase difference to be occur between the two side bands to enable the reception of the two side bands even when the two side bands interfere with each other.

Figure 5:
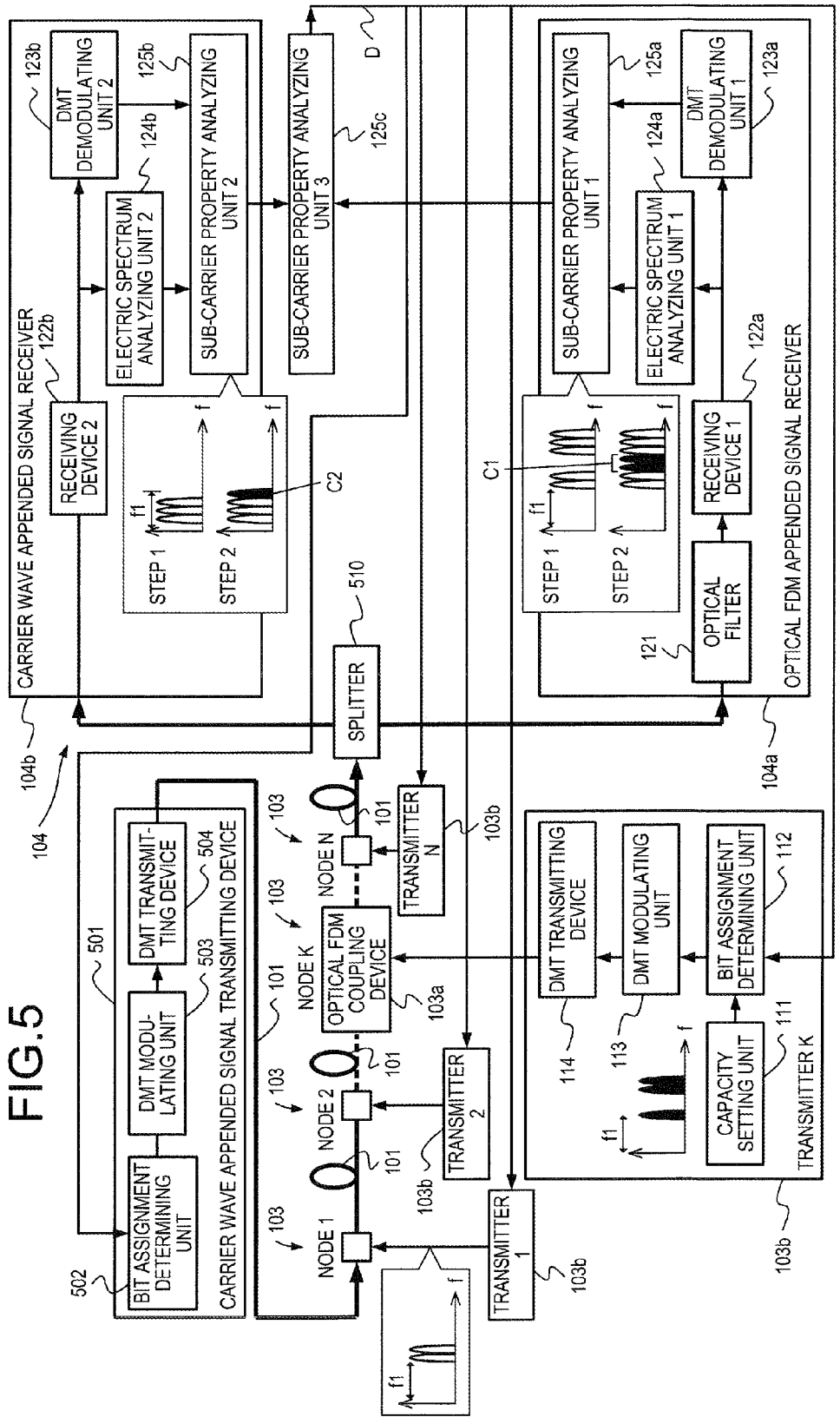
FIG. 5 is a diagram of the optical frequency division multiplex transmission system according to a second embodiment.

FIG. 5 is a diagram of the optical frequency division multiplex transmission system according to the second embodiment. Components identical to those of the first embodiment are given the same reference numerals used in the first embodiment.

A carrier wave appended signal transmitting device 501 is disposed at the starting point of the optical transmission path 101 and sends the carrier wave and the carrier wave appended signal. The nodes 1 to N (103) disposed in the optical transmission path 101 are configured similarly to those of the first embodiment. The nodes 1 to N (103) each send an optical FDM appended signal. The receiver 104 disposed at the ending point of the optical transmission path 101 includes the optical FDM appended signal receiver 104a that receives the optical FDM appended signals and the carrier wave appended signal receiver 104b that receives the carrier wave appended signals.

The bit assignment information D for the sub-carriers is transmitted to the carrier wave appended signal transmitting device 501 and the plural nodes 1 to N (103). The carrier wave appended signal transmitting device 501 sets the allocation of the bits to the unused sub-carriers in the vicinity of the carrier wave based on the bit assignment information D for the sub-carriers. The plural nodes 1 to N (103) set the allocation of the bits to the unused sub-carriers for the optical FDM appended signals.

The carrier wave appended signal transmitting device 501 includes a bit assignment determining unit 502, a DMT modulating unit 503, and a DMT transmitting device 504. The bit assignment determining unit 502 is configured similarly to the bit assignment determining unit 112 (disposed in the transmitter 103b), receives an input of the bit assignment information D for the unused sub-carriers, and determines the sub-carrier to which the bits for the information to be transmitted are to be assigned, and the bit count of bits to be assigned. The DMT modulating unit 503 assigns to the unused sub-carrier, the bit count determined by the bit assignment determining unit 502 and outputs a multi-carrier signal (a DMT modulation signal) of the carrier wave. The DMT transmitting device 504 outputs, as light, the DMT modulation signal by the DMT modulating unit 503 to the optical transmission path 101.

The carrier wave appended signal transmitting device 501 can send information (for example, the control information) to not only the receiver 104 at the ending point of the optical transmission path 101 but also to the nodes 1 to N (103) in the optical transmission path 101, using the multi-carrier signals. In each of the nodes 1 to N (103), the provision of the receiving unit that branches and receives the carrier wave appended signals enables the extraction of the carrier wave appended signals sent by the carrier wave appended signal transmitting device 501.

The receiver 104 disposed at the ending point of the optical transmission path 101 includes two receivers (the optical FDM appended signal receiver 104a and the carrier wave appended signal receiver 104b) each employing a reception method different from that of each other. A splitter 510 is disposed at the ending point of the optical transmission path 101 and splits the optical signal (the transmission signal) to the optical FDM appended signal receiver 104a and the carrier wave appended signal receiver 104b.

The optical FDM appended signal receiver 104a receives the optical FDM appended signals sent by the nodes 1 to N (103). The nodes 1 to N each transmit based on the DMT modulation a sub-carrier whose frequency has a frequency difference greater than or equal to f1 with respect to the carrier wave. The optical filter 121 transmits one side band (for example, an upper side band) of the carrier wave and causes a receiving device 1 (122a) to detect the optical signal. A DMT demodulating unit 1 (123a) DMT-demodulates the optical FDM appended signals transmitted by the nodes 1 to N (103) and outputs the demodulated optical FDM appended signals to an external destination. The DMT demodulating unit 1 (123a) extracts a frequency band whose frequency difference from the carrier wave exceeds the frequency f1, using an electric filter.

An electric spectrum analyzing unit 1 (124a) analyzes and outputs the electric spectrum of the output (the optical FDM appended signals) of the receiving device 1 (122a). A sub-carrier property analyzing unit (125a) analyzes the state of the sub-carrier that can be newly allocated for bit assignment, based on the output of the electric spectrum analyzing unit 1 (124a) and the output of the DMT demodulating unit 1 (123a). As depicted in FIG. 5, in the analysis executed by the sub-carrier property analyzing unit 1 (125a), the sub-carrier property analyzing unit 1 executes step 1: an analysis of the currently used sub-carrier number, the sub-carrier count, and the degree of multiple values and thereafter, step 2: an analysis of the unused sub-carrier number, the sub-carrier count, and the degree of multiple values of the unused carrier wave that can be newly allocated for bit assignment. The sub-carrier property analyzing unit 1 (125a) outputs to a sub-carrier property analyzing unit 3 (125c), information concerning the sub-carriers that can be newly allocated for bit assignment ("C1" in FIG. 5).

The carrier wave appended signal receiver 104b receives the carrier wave appended signals and therefore, as above, no filter is necessary and a receiver 2 (122b) can detect the optical signal and a DMT demodulating unit 2 (123b) can directly modulate the carrier wave appended signals. The DMT demodulating unit 2 (123b) extracts the frequency band whose frequency difference from the carrier wave is within the frequency f1, using an electric filter. Thereby, the carrier wave appended signals sent by the carrier wave appended signal transmitting device 501 can be received. No optical filter is necessary and as a result, the power loss of the optical signal can be suppressed and the reception can be executed with an excellent S/N ratio.

An electric spectrum analyzing unit 2 (124b) analyzes and outputs the electric spectrum of the output (the carrier wave appended signals) of the receiving device 2 (122b). A sub-carrier property analyzing unit (125b) analyzes the state of the sub-carriers in the vicinity of the carrier wave that can newly be allocated (within the frequency difference f1) based on the output of the electric spectrum analyzing unit 2 (124b) and the output of the DMT demodulating unit 2 (123b). As depicted in FIG. 5, in the analysis executed by the sub-carrier property analyzing unit 2 (125b), the sub-carrier property analyzing unit 2 (125b) executes step 1: an analysis of the sub-carrier number, the sub-carrier count, and the degree of multiple values of the sub-carrier currently used in the vicinity of the carrier wave; and thereafter, executes step 2: an analysis of the unused sub-carrier number, the sub-carrier count, and the degree of multiple values of the unused sub-carrier that can newly be allocated. The sub-carrier property analyzing unit 2 (125b) outputs to the sub-carrier property analyzing unit 3 (125c), information concerning the sub-carriers that can be newly allocated for bit assignment ("C2" in FIG. 5).

The sub-carrier property analyzing unit 3 (125c) consolidates and analyzes the output results of the sub-carrier property analyzing units 1 and 2 (125a and 125b) and outputs to the nodes 1 to N (103), information concerning unused sub-carriers ("C1" in FIG. 5) for the carrier wave signal that can be newly allocated for bit assignment and information concerning the unused sub-carriers ("C2" in FIG. 5) for the signal for the optical FDM as the analysis result.

The optical FDM appended signal receiver 104a and the carrier wave appended signal receiver 104b that are configured as described above can be accommodated in one single housing of the receiver 104, and the sub-carrier property analyzing unit 3 (125c) can also be accommodated in the same housing of the receiver 104. The functions of the sub-carrier property analyzing units 1 to 3 (125a to 125c) may be integrated into one function.

As described, the carrier wave appended signals and the optical FDM appended signals are split from each other by the splitter and are received by the receivers dedicated thereto.

The receivers analyze the electric spectrums of the carrier wave appended signals and the optical FDM appended signals to monitor the state of use of the sub-carriers, and execute the bit assignment corresponding to the transmission property based on the DMT demodulation result. The carrier wave appended signal transmitting device and the nodes can execute transmission using the unused sub-carriers and can each execute bit assignment corresponding to the transmission property of the sub-carrier. Thereby, the efficiency of frequency use can be improved.

The carrier wave appended signal receiver that receives the sub-carriers in the vicinity of the carrier wave and the optical FDM appended signal receiver that receives the optical FDM appended signals whose frequencies are away from the carrier wave by the frequency difference f1, are separated from each other. Thereby, the carrier wave appended signal receiver does not require an optical filter and the configuration thereof can be simplified.

In a third embodiment, the transmitter disposed at the starting point of the optical transmission path is configured to determine bit assignment for each of the nodes. FIG. 6 is a diagram of the optical frequency division multiplex transmission system according to the third embodiment.

A transmitter A (601) is disposed at the starting point of the optical transmission path 101. The transmitter A (601) includes the light source (LD) 102 of the carrier light, a bit assignment determining unit 602, and a bit assignment information transmitting device 603. The bit assignment determining unit 602 transmits bit assignment information B for the unused sub-carriers to the nodes 1 to N (103) through the bit assignment information transmitting device 603.

Each of the nodes 1 to N (103) includes a bit assignment information receiving device 605 in the transmitter 103b in addition to the configuration of the node according to the second embodiment. The bit assignment information receiving device 605 receives the bit assignment information B transmitted from the bit assignment determining unit 602 of the transmitter A (601) and outputs the bit assignment information B to the bit assignment determining unit 112.

The configuration of the receiver 104 is same as that in the first embodiment.

According to the above configuration, in the node K (103), the bit assignment determining unit 112 of the transmitter K (103b) determines the transmission capacity based on the required capacity and the bit count of bits to be assigned. The DMT modulating unit 113 modulates and outputs the multi-carrier signal based on the bit assignment information B instructed from the transmitter A (601). The DMT transmitting device 114 produces an optical signal and the optical FDM coupling device 103a appends the information to the transmission signal in the optical transmission path 101.

As to the other nodes 1 to N (103), similarly, the optical FDM coupling devices 103a append the multi-carrier optical signals (DMT optical signals) produced by the transmitters 1 to N (103b) to the transmission signal of the optical transmission path 101. The optical FDM appended signals appended by the nodes 1 to N (103) are received by the receiver 104 at the ending point of the optical transmission path 101.

As described, in the third embodiment, the transmitter A can centrally determine the bit assignment for each of the sub-carriers in used frequency band in the optical FDM scheme. The nodes 1 to N (103) each can easily determine the degree of multiple values for each of the sub-carriers based on the bit assignment information.

In addition to the above configuration, the analysis of the sub-carrier property described in the second embodiment may be executed. The sub-carrier property analyzing unit 125 of the receiver 104 depicted in FIG. 6 monitors the state of the use of the sub-carriers based on the results of the electric spectrum analyzing unit 124 and the DMT demodulation by the DMT demodulating unit 123, and analyzes the bit assignment corresponding to the transmission property based on the DMT demodulation result. The sub-carrier property analyzing unit 125 transmits, as feedback and as the bit assignment information D, the analysis result to the bit assignment determining unit 602 of the transmitter A (601).

Thereby, the transmitter 103b in each of the nodes 1 to N (103) again executes (reviews) the bit assignment. Therefore, each of the nodes 1 to N (103) can use the unused sub-carriers by monitoring the state of the use of the sub-carriers, and can execute data transmission having the degree of multiple values corresponding to the transmission property of the sub-carrier. Therefore, the efficiency of frequency use in the optical FDM scheme can be improved.

The bit assignment determining unit 602 of the transmitter A (601) may be configured to receive input of information E concerning the bit assignment transmitted from the transmitter 103b of each of the nodes 1 to N (103). The bit assignment determining unit 602 transmits the bit assignment information B for the unused sub-carriers to each of the nodes 1 to N (103). In this manner, the state of the use of the sub-carriers may be fed back and thereby, the bit assignment may be changed.

An arbitrary modulation scheme is applicable for the modulation signals to transmit and receive the bit assignment information B. The bit assignment information B is not only sent to the optical transmission path 101 but also may take any other form of transmission.

In a fourth embodiment, the transmitter disposed at the starting point of the optical transmission path is configured to coarsely adjust the bit assignment for each of the nodes and the receiver is configured to, thereafter, finely adjust the bit assignment for the node. FIG. 7 is a diagram of the optical frequency division multiplex transmission system according to the fourth embodiment.

The fourth embodiment differs from the third embodiment in that, in the fourth embodiment, the bit assignment information D output from the sub-carrier property analyzing unit 125 of the receiver 104 is input to the bit assignment determining unit 112 of each of the nodes 1 to N (103).

In the configuration above, the bit assignment information transmitting device 603 outputs the bit assignment information B determined (corresponding to the coarse adjustment) by the bit assignment determining unit 602 of the transmitter A (601). The bit assignment information receiving device 605 of the transmitter 103b of each of the nodes 1 to N (103) receives the bit assignment information B and sends the bit assignment information B to the bit assignment determining unit 112.

In the node K (103), the bit assignment determining unit 112 of the transmitter K (103b) determines the transmission capacity from the required capacity and the bit count of bits to be assigned. The DMT modulating unit 113 modulates and outputs the multi-carrier signal based on the bit assignment instructed from the transmitter A (601). The DMT transmitting device 114 produces an optical signal and the optical FDM coupling device 103a appends the information to the transmission signal in the optical transmission path 101.

In each of the other nodes 1 to N (103), similarly, the optical FDM coupling device 103a appends the multi-carrier optical signal (the DMT optical signal) produced by each of the transmitters 1 to N (103b) to the transmission signal in the optical transmission path 101. The optical FDM appended signals appends by the nodes 1 to N (103) are received by the receiver 104 at the end point of the optical transmission path 101.

Thereafter, the sub-carrier property analyzing unit 125 of the receiver A (101) monitors the state of the use of the sub-carriers based on the result of the electric spectrum analyzing unit 124 and the demodulation result of the DMT demodulating unit 123, and analyzes the bit assignment corresponding to the transmission property, based on the DMT demodulation result. The sub-carrier property analyzing unit 125 transmits the analysis result as the bit assignment information D as feedback to the bit assignment determining unit 112 of the transmitter 103b of each of the nodes 1 to N (103).

Thereby, in each of the nodes 1 to N (103), the bit assignment determining unit 112 of the transmitter 103b finely adjusts the bit assignment corresponding to the transmission property.

In addition to the above configuration, the bit assignment determining unit 112 of the transmitter 103b of each of the nodes 1 to N (103) is configured to output bit assignment information E (see FIG. 6) as feedback to the bit assignment determining unit 602 of the transmitter A (601), and this configuration may be used to change the bit assignment by the transmitter A (601).

According to the fourth embodiment, the transmitter A (601) does not need to execute the intensive control as the transmitter A (601) does in the third embodiment. In the fourth embodiment: the transmitter A coarsely adjusts the bit assignment for each of the sub-carriers for the used frequency band in the optical FDM scheme; and the receiver 104 property-analyzes the property of the transmission using the unused sub-carriers and feeds back the bit assignment information D to the nodes 1 to N (103). Thereby, the transmitter 103b of each of the nodes 1 to N (103) can again execute (review) the bit assignment for each of the sub-carriers. In this manner, according to the fourth embodiment, the degree of multiple values can more accurately be acquired corresponding more accurately to the transmission property of the sub-carrier and the data transmission can be executed with the acquired degree of multiple values. Therefore, the efficiency of frequency use in the optical FDM scheme can further be improved.

In the embodiment, the electric spectrum analyzing unit 124 disposed in the receiver 104 may be configured to have the central frequency of the sub-carrier set therein in advance for each sub-carrier number (forming a grid) and to monitor only the electric spectra in the vicinity of each sub-carrier number. Thereby, the electric spectrum analyzing unit 124 can easily detect the sub-carriers.

Various types of DMT transmitting devices are applicable as the DMT transmitting device 114 of the transmitter 103b in the embodiment, and a directly modulated laser (DML) or an electro-absorption modulator integrated laser diode (EML) including an EA modulating device and a laser integrated module is applicable and a combination of a laser and an LN modulating device (for example, an InP-MZ modulating device, etc.) is also applicable.

An optical amplifier relaying device is configured to be disposed halfway along the optical transmission path 101 and to optically amplify the transmission signal.

According to the embodiments, the optical FDM transmission system enables the plural nodes in the optical transmission path to each send the node appended signal information, and the receiving apparatus to collectively receive the node appended signal information. The signal transmitted by each of the nodes of the optical FDM system sequentially varies. Corresponding to the variation, unused frequency bands occur at the frequencies (sub-carriers) of unused nodes in the entire frequency band. The optical FDM transmission system enables the transmitting apparatus to send the information using the unused sub-carriers based on the DMT modulation, based on the results of the detection and the analysis of the unused sub-carriers.

In this case, the information can be modulated accurately at the central frequency of the unused sub-carrier by the DMT modulation, and modulation sessions for the plural sub-carriers can simultaneously be executed. In particular, even when the unused sub-carriers are discretely generated, this can be coped with. Thereby, when an unused sub-carrier arises, additional information using the unused sub-carrier can be accurately frequency-multiplexed and transmitted by the simple configuration. Consequently, the efficiency of frequency use of the optical FDM transmission can be improved.

According to an embodiment, the efficiency of frequency use in wavelength division multiplex transmission can be improved with a simple configuration.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmitting apparatus used in an electrical frequency division multiplex transmission system comprising plural nodes that are on an optical transmission path and that respectively frequency-multiplex a sub-carrier of a unique frequency and a carrier wave to transmit information to a receiving apparatus on the optical transmission path, the transmitting apparatus being disposed in each of the nodes and comprising:

a determining unit that receives an input of information concerning unused sub-carriers of a transmission signal in the optical transmission path and determines transmission of the information to the receiving apparatus using an unused sub-carrier;

an electrical frequency division multiplex transmission unit that using a frequency of the unused sub-carrier determined by the determining unit, modulates the input information to be transmitted to the receiving apparatus; and a coupling unit that adds to the transmission signal in the optical transmission path, a modulation signal modulated by the electrical frequency division multiplex transmission unit, wherein the determining unit determines assignment of the input information to plural unused sub-carriers, based on the information concerning the unused sub-carriers, the electrical frequency division multiplex transmission unit modulates the input information using frequencies of the unused sub-carriers determined by the determining unit, and the coupling unit adds to the transmission signal in the optical transmission path, plural sub-carrier modulation signals modulated by the electrical frequency division multiplex transmission unit.

2. The transmitting apparatus according to claim 1, wherein
the determining unit determines whether sending of the input information using the unused sub-carrier is possible, based on information concerning a transmission property of each unused sub-carrier of the transmission signal in the optical transmission path and information concerning a required capacity that is necessary for transmission of the input information.

3. The transmitting apparatus according to claim 1, wherein
the determining unit determines whether sending of the input information using a bit count of bits to be assigned to the unused sub-carrier and the unused sub-carrier is possible, based on information concerning bit assignment for each unused sub-carrier of the transmission signal in the optical transmission path and information concerning a required capacity that is necessary for transmission of the input information.

4. The transmitting apparatus according to claim 1, wherein
a predetermined frequency difference is provided between the frequency of the sub-carrier in the optical transmission path and the carrier wave, and
a frequency difference from a baseband to frequency-multiplex the input information by the electrical frequency division multiplex transmission unit is equal to a frequency difference in the optical transmission path.

5. The transmitting apparatus according to claim 1, wherein the electrical frequency division multiplex transmission unit performs discrete multi-tone modulating.

6. A receiving apparatus used in an electrical frequency division multiplex transmission system comprising plural nodes on an optical transmission path respectively frequency-multiplexing a sub-carrier of a unique frequency and a carrier wave, the receiving apparatus comprising:
a first receiver that receives a sub-carrier that is in a transmission signal in the optical transmission path and of a frequency that is in a vicinity of that of the carrier wave;
a second receiver that receives a sub-carrier that is in the transmission signal in the optical transmission path and that is of a frequency away from that of the carrier wave by a frequency greater than or equal to a predetermined frequency difference; and
a splitter that is disposed at an ending point of the optical transmission path and that splits the transmission signal to the first and the second receivers, wherein each of the first and the second receivers includes
an analyzing unit that analyzes an unused sub-carrier of the transmission signal in the optical transmission path, and outputs a result of the analysis to the nodes as information concerning the unused sub-carrier.

7. The receiving apparatus according to claim 6, wherein the analyzing unit analyzes sub-carrier number, a sub carrier count, and degrees of multiple values of unused sub-carriers of the transmission signal in the optical transmission path and outputs a result of the analysis to the nodes as information concerning the unused sub-carriers.

8. The receiving apparatus according to claim 6, wherein the second receiver comprises a filter that transmits one side band among side bands of the carrier wave included in the transmission signal.

9. An electrical frequency division multiplex transmission system in which plural transmitting apparatuses provided in nodes on an optical transmission path respectively frequency-multiplex a sub-carrier of a unique frequency and a carrier wave to transmit information to a receiving apparatus on the optical transmission path, the electrical frequency division multiplex transmission system comprising:
the transmitting apparatuses respectively including:
a determining unit that receives an input of information concerning unused sub-carriers of a transmission signal in the optical transmission path and determines transmission of the information to the receiving apparatus using an unused sub-carrier,
an electrical frequency division multiplex transmission unit that using a frequency of the unused sub-carrier determined by the determining unit, modulates the input information to be transmitted to the receiving apparatus, and
a coupling unit that adds to the transmission signal in the optical transmission path, a modulation signal modulated by the electrical frequency division multiplex transmission unit;
the receiving apparatus including
an analyzing unit that analyzes the unused sub-carriers of the transmission signal in the optical transmission path, and outputs a result of the analysis to the nodes as the information concerning the unused sub-carriers, and
a second transmitting apparatus disposed at a starting point of the optical transmission path, wherein
the second transmitting apparatus includes a second determining unit that determines degrees of multiple values of the unused sub-carriers, outputs information concerning the unused sub-carriers to the transmitting apparatuses of the nodes, and causes the transmitting apparatuses to execute transmission using the unused sub-carriers, the second determining unit, thereafter, determining again the degree of multiple values of the input information for the plural unused sub-carriers, based on the information concerning the unused sub-carriers input from the receiving apparatus.

10. The electrical frequency division multiplex transmission system according to claim 9, wherein
the second transmitting apparatus, using the optical transmission path, transmits the information concerning the unused sub-carriers to the transmitting apparatus of each of the nodes.

11. The electrical frequency division multiplex transmission system according to claim 9, wherein
the second determining unit determines again the degree of multiple values of the input information for the unused sub-carriers based on the information concerning the unused sub-carriers input from the transmitting apparatus of each of the nodes.

12. The electrical frequency division multiplex transmission system according to claim 9, wherein
the electrical frequency division multiplex transmission unit performs discrete multi-tone modulating.

* * * * *